United States Patent [19]

Zimmermann

[11] Patent Number: 4,625,884

[45] Date of Patent: Dec. 2, 1986

[54] JUG, MORE PARTICULARLY INSULATING JUG

[75] Inventor: Anso Zimmermann, Bad Hersfeld, Fed. Rep. of Germany

[73] Assignee: Rotpunkt Dr. Anso Zimmermann, Niedelfaula, Fed. Rep. of Germany

[21] Appl. No.: 610,870

[22] Filed: May 16, 1984

[30] Foreign Application Priority Data

Jan. 5, 1984 [DE] Fed. Rep. of Germany ... 8400247[U]

[51] Int. Cl.$^4$ .......................... B67D 5/60; A47J 41/00; B65D 47/00; B65D 5/72
[52] U.S. Cl. ............................... 222/131; 222/465 A; 222/484; 222/519; 222/552; 222/572; 215/13 A; 215/309
[58] Field of Search ............... 222/484, 489, 549, 552, 222/564, 572, 563, 519, 485, 479, 475, 465 A, 131, 554, 566, 575, 183, 567; 215/357, 307, 309, 13 A, 13 R

[56] References Cited

U.S. PATENT DOCUMENTS

| | | | |
|---|---|---|---|
| 142,613 | 10/1873 | Chinnock | 222/489 |
| 231,144 | 8/1880 | Betts | 222/489 |
| 1,777,826 | 10/1930 | Cone | 215/309 |
| 2,167,476 | 7/1939 | Diefenbach | 222/484 X |
| 3,809,275 | 5/1974 | Ek | 222/519 X |
| 3,955,712 | 5/1976 | Santore | 222/80 |

FOREIGN PATENT DOCUMENTS

| | | | |
|---|---|---|---|
| 892136 | 12/1963 | France | 222/566 |
| 202775 | 6/1965 | Sweden | 215/13 R |
| 911955 | 12/1962 | United Kingdom | 222/572 |
| 970574 | 9/1964 | United Kingdom | 222/183 |
| 1181289 | 2/1970 | United Kingdom | 222/183 |
| 1339005 | 11/1973 | United Kingdom | 222/519 |

Primary Examiner—H. Grant Skaggs
Assistant Examiner—Gregory L. Huson
Attorney, Agent, or Firm—Lewis H. Eslinger

[57] ABSTRACT

An insulating jug having a protective housing is formed of a molded construction of synthetic material and includes an integrally formed spout, which is closed or pipe-shaped and has a conical cross-section that diverges inwardly. A recess is formed in the top of the protective housing to receive a lid element that is threaded on its lower portion and by inserting the threaded portion into a mating threaded portion in the top of the protective housing respective sealing surfaces are brought into contact, and the top of the lid resides within the recess and blocks the spout. Pouring is accomplished by use of relieved portions on the threaded part of the lid, which when unthreaded appropriately permit liquid to exit a container arranged within the molded protective housing.

7 Claims, 2 Drawing Figures

JUG, MORE PARTICULARLY INSULATING JUG

TECHNICAL FIELD OF INVENTION

The invention relates to a jug according to the pre-characterizing part of claim 1.

BRIEF DESCRIPTION OF THE PRIOR ART

In order to shape the conical pouring channel in the spout of such a known jug, a correspondingly conical core is required which core must be drawn inwards for removal after the injection-moulding process. This last cited measure is problematic in the case of the known design, because the lid of the jug engages with a thread in a counterthread on the inside wall of a recess which is arranged in the housing above the opening and into which the pouring channel of the spout opens. A core removable by turning (thread) or a so-called collapsing core is therefore necessary in order to form the thread on the housing side. Both possibilities are problematic in view of the existence of the inwardly withdrawable pouring channel core because the arrangement of this core is complicated owing to the required movement for removing the core from the housing side thread.

OBJECT OF INVENTION

The underlying object of the invention is to develop a jug of the present design in such a way that a core which is necessary for the construction of the pouring channel in a closed spout may be arranged or drawn inwards easily.

SUMMARY OF THE INVENTION

In the case of one embodiment of a so constructed jug, the arrangement of or the drawing inwards of the spout pouring channel forming core is simplified because a simple core provided which merely needs to be drawn out after the injection-moulding process, in order to shape the recess into which the pouring channel opens out. When a core of this kind is present, the core for constructing the pouring channel in the spout can, of course, easily be integrated.

Independent of the previously cited advantage, the present invention also results in a lid for the jug of simple form and small structural size which may, therefore, be produced simply and cheaply.

The development according to the invention is also advantageous when instead of a form locking or shaped closure connection, a frictional locking connection is provided between the lid and the housing, for example, in the form of a known expanding seal. A seal of this kind can be designed so that it is considerably smaller for a development according to the invention, this being of significance not only with regard to the operation but also with regard to the costs of production. In the case of insulating jugs having an insertable inner container, there is an advantage lying in the fact that the core for shaping the mounting can be drawn inwards for removal.

According to claim 2, the shaped closure connection is formed by means of a thread. By this means the lid can be handled easily and conveniently and a reliable seal is also guaranteed.

The constructions according to the present invention result not only in simple pouring channels but also mean that, in particular, a screw lid need not be removed completely to enable pouring of the liquid contents of the jug to take place. For the purposes of pouring, merely a small opening movement of the lid is required in order to allow the pouring channels to become effective. In this pouring position the lid is held securely in the housing so that when the jug is tilted during pouring, the lid does not need to be held. The resulting heat barrier in the opened position of the lid is also of great significance.

The further embodiment or development according to the present invention is recommended with regard to the demand that it be possible to empty a jug completely. In this case, the pouring channel is arranged, when pouring out, at that point of the opening which is the deepest in each case so that when the jug is tilted in a corresponding manner, the contents can flow out completely.

In the case of a construction according to another feature of the present invention, the portion of the lid above the projection is not only able to be of use when manipulating the lid but is also able to carry out the sealing action by sealing the opening. If the recess, at least on the side opposite the spout, is enlarged radially, a comparatively large area is given as a result of which, on the one hand, the action of drawing the spout pouring channel forming core is facilitated and, on the other hand, spouts of greater length can be constructed.

The constructions according to further features of the invention improve the handling of the lid or of the jug, and the pouring position of the lid can be adjusted accurately to the desired position.

The development according to another feature of the invention renders possible the largest possible opening for access to the inside of the insulating container and can assist the latter's stabilization in the housing.

BRIEF DESCRIPTION OF THE DRAWINGS

An exemplary embodiment of the invention is described in greater detail in the following with the aid of a simplified drawing in which.

DETAILED DESCRIPTION OF THE PREFERRED EMBODIMENT OF THE INVENTION

Figure 1:
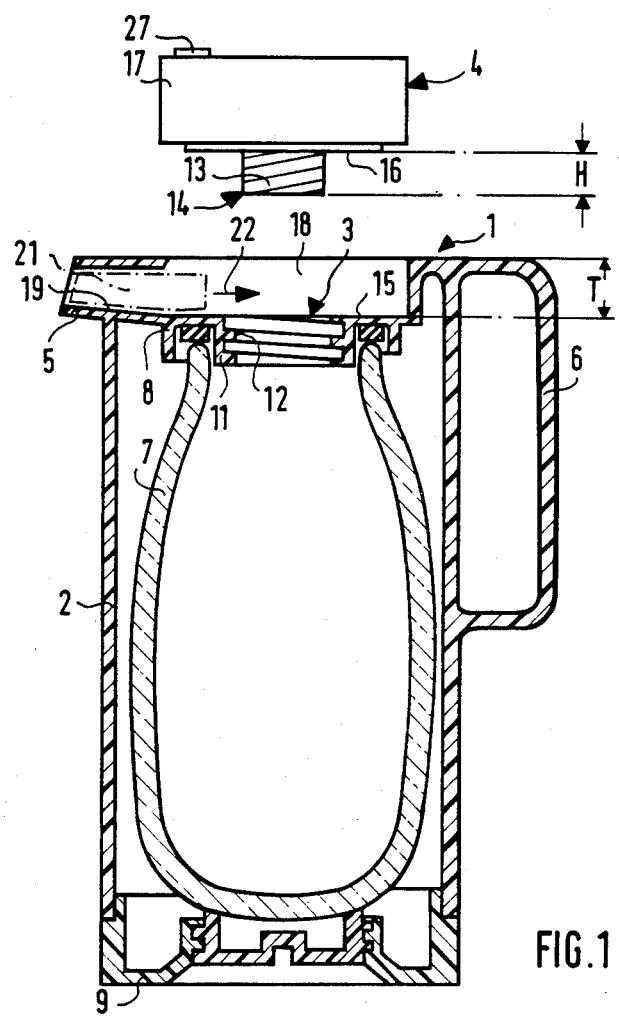
FIG. 1 shows, in vertical section, an insulating jug constructed according to the invention with raised lid.
Figure 2:
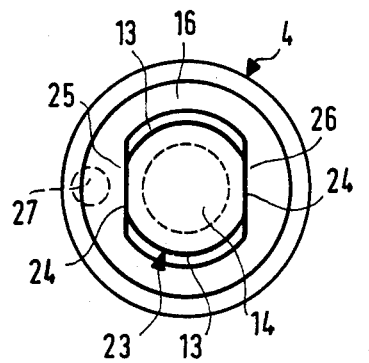
FIG. 2 shows a view of the lid from below.

The jug, in FIG. 1, designated in general 1, is an insulating jug having a housing 2 which is injection-moulded, more particularly from synthetic material, the upper opening 3 of which is sealable by a lid 4, having an enclosed spout 5 injection-moulded thereon in one piece, a handle 6 also injection-moulded thereon in one piece and an insulating container 7 which is received in the housing 2 and which is clamped between a housing shoulder 8, arranged in the upper region of the housing, and a housing floor 9 which may be screwed on the housing 2. The opening 3 is arranged inside the housing shoulder 8 that is, it is formed through a ring-shaped mounting 11 which extends inwardly from the housing shoulder 8. The ring-shaped mounting 11 has an internal thread 12, into which there may be screwed a projection 14 of the lid 4, the projection being provided with a corresponding external thread 13 and projecting coaxially from the underside of the lid 4. The sealing surface of the opening 3 is designated 15 and the complementary sealing surface of the lid 4 is designated 16. When the lid 4 is in the screwed-in position, the sealed position, that is, the cylindrical portion of the lid 4 which is designated as handgrip 17 is received in a recess 18 in the housing 2, which recess is located above the opening 3 and is enlarged radially in respect to the latter. A pouring channel 19, which conically diverges inwardly, of the spout 5 opens out in this recess 8. In order to produce the housing 2 as an injection-moulded or cast element, a conical core 21, which is represented in a simplified manner by a dot-dash line and which must be drawn inwards for the purposes of removal from the mould, is required for the construction of the pouring channel 19. It may be recognized that the core 21 can, for example, be drawn in the direction of the arrow 22 in order to be removed. If long spouts are to be produced, it is recommended that the pouring channel 19 and the core 21 be arranged in such a way that the latter can be drawn inwards radially. In such cases, that area of the recess 18 which lies opposite the spout 5 presents itself as a comparatively large free area into which the core 21 can be drawn.

If a steeper angle arrangement of the pouring spout 5 is desired, greater depth T for the recess 18 must be provided so that the core 21 can be drawn as far as the edge of the opening opposite it or, rather, into the opening 3 in order to be removed.

Two flattened areas 24 which extend over the overall height H of the threaded projection 14 and which at any rate end below the sealing surface 16 of the lid 4 are provided, opposite each other, in the casing surface 23 of the projection 14, which is set into the opening 3 in the sealing position of the lid 4. These flattened areas 24 represent channels which do not make contact with the ring-shaped mounting 11. Of these channels, one channel 25 forms a pouring channel and the other channel 26 forms an air channel. The lid 4 in FIG. 1 is represented in a raised, non-engaged position, however, when it is in its engaged position and has been turned in the pouring position in which the pouring channel 25 and the air channel 26 are effective because the sealing surfaces 15, 16 are at a slight distance from each other as a result of a twist of the lid 4 through (in this case) 180°. The attachment 27 on the upper side of the lid 4 represents a marking whereby it is possible to see the rotary position of the lid 4 or it is possible to see how far the lid 4 has to be turned in order to reach either the pouring position or the sealed position. In the pouring position, the attachment 27 points to the spout 5 while in the sealed position, the attachment 27 points to the handle 6. In this position the air channel is located on the side of the spout 5, but no liquid can pass because the surfaces 15 and 16 are in contact.

In the pouring position the thread is still engaged so that the lid 4 is held securely even when the insulating jug 1 is tilted at an extreme angle.

Of course, other embodiments are also possible. When a expanding or friction fit closure is used instead of the screw-type closure, a channel is provided inside the projection of the lid, the channel opening radially outwardly below the sealing surface 16 of the lid 4. The pouring channel of the closed spout can be cylindrical or even in the shape of a truncated pyramid. One of the sealing surfaces can be formed by means of an elastic sealing lip. Instead of the flattened areas 24, 25, there may be grooves in the projection and/or in the mounting, and, if applicable, even thread-free areas may be sufficient. A cast metal portion is also possible instead of a plastic injection-moulded portion.

What is claimed is:

1. An insulating jug comprising a protective housing having an injection molded construction of synthetic material and an insulating container inserted therein, said insulating container being held between a floor member and a shoulder in an upper region of said protective housing, an opening of the insulating jug being arranged in said shoulder, an open annular recessed area being formed above said opening and shoulder in said protective housing, said open annular recessed area being dimensioned larger than said opening and adapted to receive a lid for attachment by complementary threads provided on said lid and on said shoulder of the protective housing, and a laterally projecting spout commencing at said open annular recessed area, and characterized in that said spout is of pipe-shaped cross-section and is conically enlarged inwardly, said spout being integrally formed with said injection molded-construction, synthetic-material protective housing, and an annular flange is arranged at an inner edge of said shoulder and projecting into the opening of the insulating container and having one of said complementary threads formed as an internal thread thereon, and said lid has on a lower side a projection having the other of said complementary threads formed as an external thread thereon for engagement with the internal thread of said annular flange, said lid having a shoulder above said projection with a sealing surface that cooperates with an upper surface of said annular flange of said shoulder, so that in a first lid position said sealing surface of said lid and said upper surface form a seal and in a second lid position axially spaced apart from said first position and having said threads engaged, said sealing surface is spaced apart from said upper surface, whereby liquid can be poured from said container.

2. A jug according to claim 1, characterized in that on the lid there is provided a marking which indicates by it's rotational position relative to the housing when the lid is in the pouring position.

3. A jug according to claim 1, characterized in that the jug has a handle which is integral with the housing and which lies diametrically opposite the spout.

4. A jug according to claim 1, in which in said annular flange at least one axially extending flattened area is provided arranged on that side of the annular flange that faces the spout when the lid is in a pouring position.

5. A jug according to claim 1, further comprising a casing surface provided on said lid projection and having at least one axially extending flattened area, said flattened area being so formed to end before said sealing surface of the lid and being arranged on that side of the projection that faces the spout when said lid is in a pouring position.

6. A jug according to claim 5, characterized in that the lid has a pouring position which is displaced in respect of its closed position by a given angle of rotation, more particularly 180°, and said axially extending flattened area is located on that side of the lid which points toward the spout when the lid is in the pouring position.

7. A jug according to claim 5, characterized in that the lid has a pouring position which is displaced in respect of its closed position by a given angle of rotation, more particularly 180°, and said axially extending flattened area is located on that side of the lid which points towards the spout when the lid is in the pouring position and further comprising a second flattened area diametrically opposite said at least one flattened area for venting the jug in said pouring position.

* * * * *